(12) United States Patent
Ueda

(10) Patent No.: US 9,273,632 B2
(45) Date of Patent: Mar. 1, 2016

(54) HEAT EXCHANGER FOR AIRCRAFT ENGINE

(71) Applicant: SUMITOMO PRECISION PRODUCTS CO., LTD., Amagasaki-shi, Hyogo (JP)

(72) Inventor: Tatsuya Ueda, Hyogo (JP)

(73) Assignee: SUMITOMO PRECISION PRODUCTS CO., LTD., Amagasaki-Shi (JP)

( * ) Notice: Subject to any disclaimer, the term of this patent is extended or adjusted under 35 U.S.C. 154(b) by 0 days.

(21) Appl. No.: 14/243,769

(22) Filed: Apr. 2, 2014

(65) Prior Publication Data

US 2015/0000865 A1 Jan. 1, 2015

Related U.S. Application Data

(63) Continuation of application No. PCT/JP2013/004011, filed on Jun. 26, 2013.

(51) Int. Cl.
*B60H 3/00* (2006.01)
*F02K 3/115* (2006.01)
(Continued)

(52) U.S. Cl.
CPC . *F02K 3/115* (2013.01); *F02C 7/14* (2013.01); *F28D 1/035* (2013.01); *F28F 3/02* (2013.01); *F28F 3/025* (2013.01); *F28F 3/12* (2013.01); *F28F 27/02* (2013.01); *F05D 2230/237* (2013.01); *F05D 2250/232* (2013.01);
(Continued)

(58) Field of Classification Search
CPC ............... F28F 3/025; F28F 3/06; F28F 3/12; F28F 3/14; F28F 13/003; F28F 2215/04; F28F 2215/08; F28F 2215/06; F28D 1/0366

USPC .......... 165/44, 56, 57, 96, 97, 103, 160, 169, 165/170, 176; 415/144; 29/890.039; 60/752, 806
See application file for complete search history.

(56) References Cited

U.S. PATENT DOCUMENTS 5,363,654 A 11/1994 Lee
5,484,122 A 1/1996 DeSalve
(Continued)

FOREIGN PATENT DOCUMENTS

JP 03-267618 A 11/1991
JP 04-116315 A 4/1992
(Continued)

OTHER PUBLICATIONS

International Search Report dated Sep. 24, 2013 in application No. PCT/JP2013/004011.
(Continued)

*Primary Examiner* — Travis Ruby
(74) *Attorney, Agent, or Firm* — Maschoff Brennan

(57) ABSTRACT

A heat exchanger for an aircraft engine includes: a body including a plate-like first member and a plate-like second member that are stacked in a thickness direction of the first and second members and joined together, and a channel which is defined in the body and in which the cooling target fluid flows; and a corrugated fin plate disposed in the channel in the body. The body is bent along a curved surface to which the heat exchanger is attached. A plurality of heat dissipation fins stand on an outer surface of at least one of the first member or the second member.

9 Claims, 7 Drawing Sheets

(51) Int. Cl.
*F02C 7/14* (2006.01)
*F28F 3/02* (2006.01)
*F28D 1/03* (2006.01)
*F28F 3/12* (2006.01)
*F28F 27/02* (2006.01)
*F28D 21/00* (2006.01)

(52) U.S. Cl.
CPC ......... *F05D2250/61* (2013.01); *F05D 2250/71* (2013.01); *F05D 2260/213* (2013.01); *F05D 2260/22141* (2013.01); *F05D 2260/606* (2013.01); *F05D 2260/98* (2013.01); *F28D 2021/0021* (2013.01); *F28D 2021/0049* (2013.01); *F28F 2250/06* (2013.01)

(56) References Cited

U.S. PATENT DOCUMENTS

| | | | | |
|---|---|---|---|---|
| 5,517,757 | A * | 5/1996 | Hayashi et al. | 29/890.039 |
| 6,962,194 | B2 * | 11/2005 | Martin et al. | 165/170 |
| 8,011,422 | B2 * | 9/2011 | Yamazaki et al. | 165/82 |
| 2003/0116311 | A1 * | 6/2003 | Fitzpatrick et al. | 165/170 |
| 2005/0115700 | A1 | 6/2005 | Martin et al. | |
| 2005/0279080 | A1 | 12/2005 | Costen et al. | |
| 2008/0095611 | A1 | 4/2008 | Storage et al. | |
| 2008/0314569 | A1 | 12/2008 | Yamazaki et al. | |
| 2009/0139221 | A1 | 6/2009 | Farah et al. | |
| 2009/0165995 | A1 | 7/2009 | Bajusz et al. | |
| 2011/0110790 | A1 | 5/2011 | Itzel et al. | |
| 2014/0044525 | A1 | 2/2014 | Storage et al. | |

FOREIGN PATENT DOCUMENTS

| | | |
|---|---|---|
| JP | 05-044927 A | 2/1993 |
| JP | 07-049041 A | 2/1995 |
| JP | 08-338633 A | 6/1995 |
| JP | 08-505682 A | 6/1996 |
| JP | 2007-127119 A1 | 5/2007 |
| JP | 2008-144752 A | 6/2008 |
| JP | 2011-089435 A | 5/2011 |
| JP | 2011-163344 A | 8/2011 |
| JP | 2014-034975 A | 2/2014 |

OTHER PUBLICATIONS

Extended European Search Report dated Apr. 16, 2015 as received in Application No. 13848105.6.

* cited by examiner

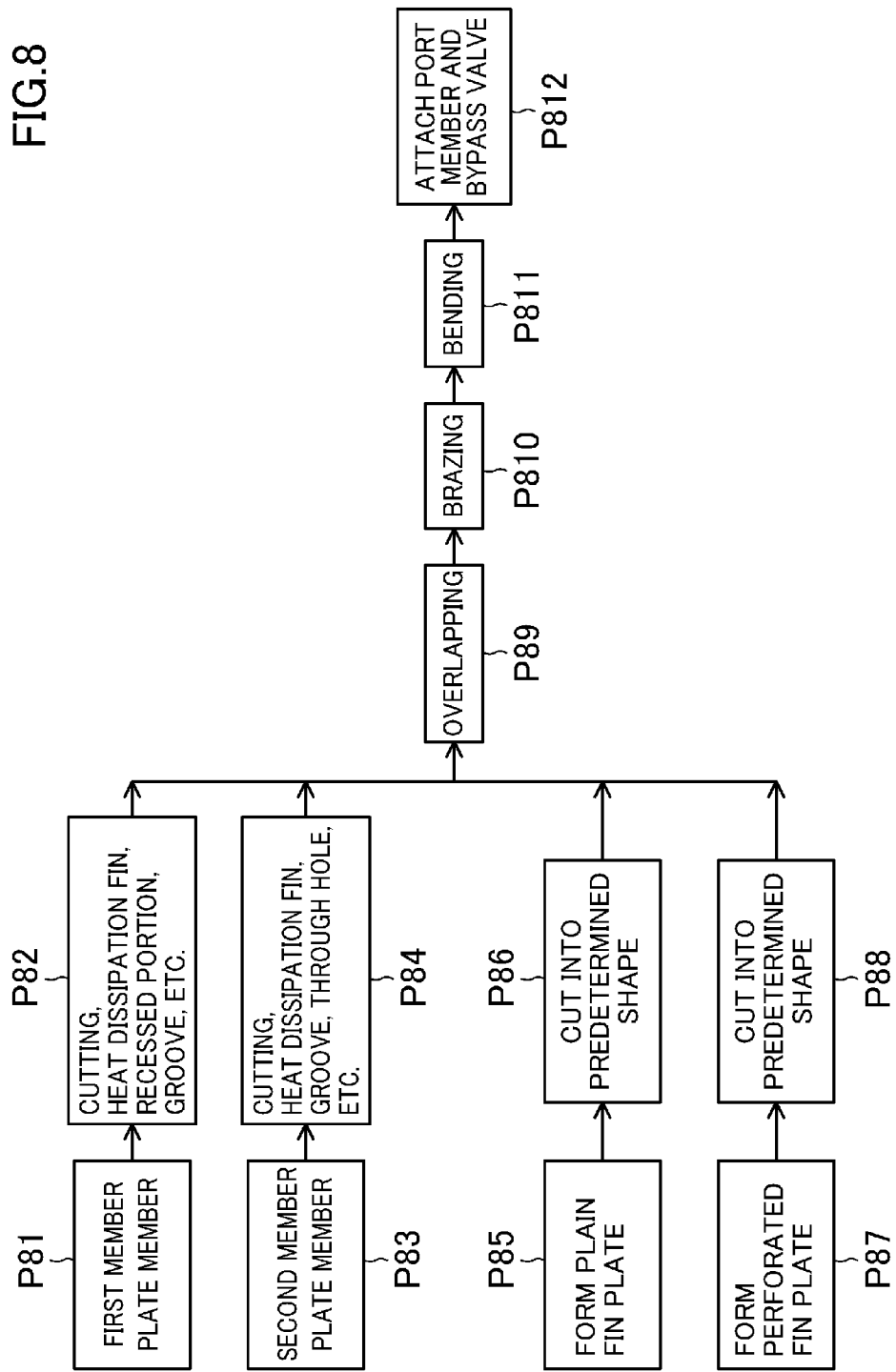

HEAT EXCHANGER FOR AIRCRAFT ENGINE

TECHNICAL FIELD

The technique disclosed herein relates to heat exchangers for use in aircraft engines, and particularly to a heat exchanger for cooling, for example, lubricating oil of an engine or lubricating oil of a generator driven by the engine.

BACKGROUND ART

Patent Document 1 describes a heat exchanger attached to a gas turbine engine for an aircraft and cooling fluid to be cooled, which will be hereinafter referred to as cooling target fluid, such as lubricating oil of the engine. The heat exchanger has an arcuate shape attached to, and extending along, for example, the inner peripheral surface of a fan casing of the gas turbine engine, and is exposed to an airflow passing through the gas turbine engine. In the arcuate heat exchanger, a plurality of channels in which cooling target fluid flows are arranged side by side along the airflow. A large number of heat dissipation fins stand on the outer surface of the heat exchanger. An inflow header for allowing cooling target fluid to flow into the inside channels and an outflow header for allowing cooling target fluid to flow out of the inside channels are attached to both ends of the arcuate heat exchanger.

Such an arcuate heat exchanger advantageously has a miniaturized size and a reduced resistance of an airflow flowing in a gas turbine engine.

CITATION LIST

Patent Document

[Patent Document 1] Japanese Unexamined Patent Publication No. 2008-144752

SUMMARY OF THE INVENTION

Technical Problem

Regarding fabrication of an arcuate heat exchanger, Patent Document 1 describes that a body including a plurality of channels is formed by extruding a metallic material such as aluminium and heat dissipation fins are attached to the body by welding or brazing. However, it is generally difficult to attach a large number of heat dissipation fins to the outer surface of the body without fail by welding or brazing. In addition, a failure in attaching the heat dissipation fins to the body would significantly reduce heat transmission performance, resulting in degradation of performance of the heat exchanger. It is also difficult to inspect whether the heat dissipation fins are attached to the body without fail or not after the heat dissipation fins have been attached to the body by welding or brazing.

Patent Document 1 also describes that the heat dissipation fins are formed by conducting an "integral fin forming process" on the body formed by extrusion, not by joining separate heat dissipation fins to the body after the formation of the body. Although not specifically described in Patent Document 1, this "integral fin forming process" is supposed to be employed to form a large number of heat dissipation fins on the outer surface of the body by obliquely scraping a thin surface portion of the body formed by extrusion such that the heat dissipation fins stand on the outer surface. This process ensures that the heat dissipation fins and the body can be continuous such that heat is transmitted therebetween.

The process, however, has a limitation on the relationship between the height of the heat dissipation fins and the pitch (i.e., the distance between adjacent fins) of the heat dissipation fins. Specifically, an increase in height of the heat dissipation fins requires an increase in length of the oblique scraping, and the pitch of the heat dissipation fins increases. On the other hand, a decrease in pitch of the heat dissipation fins requires a reduction in length of the oblique scraping, and the height of the heat dissipation fins decreases. In terms of enhancement of heat exchanger performance, it is preferable that the height of the heat dissipation fins increases and the pitch of the heat dissipation fins decreases. However, it is difficult for the above-described process to achieve both the increase in height and the decrease in pitch.

In addition, as described in Patent Document 1, in the process of forming the body by extrusion, a header member as a separate member from the body needs to be joined to the body after the process. This also increases the weight of the heat exchanger.

Further, the process of forming the body by extrusion can determine the direction of channels only in one direction that coincides with the extrusion direction. Thus, if the heat exchanger is configured such that the channel of cooling target fluid makes a U-turn, at least a header for the U-turn needs to be joined to the body. This configuration increases the weight of the heat exchanger, in a manner similar to the configuration described above.

It is therefore an object of the present to provide a heat exchanger that is to be used for an aircraft engine and can be reduced in size and weight with desired performance.

Solution to the Problem

A technique disclosed herein is directed to a heat exchanger for an aircraft engine. This heat exchanger is disposed along a curved surface in the aircraft engine and configured to cool cooling target fluid when being exposed to an airflow flowing in the engine, and the heat exchanger includes: a body including a plate-like first member and a plate-like second member that are stacked in a thickness direction of the first and second members and joined together, and a channel which is defined in the body and in which the cooling target fluid flows; and a corrugated fin plate disposed in the channel in the body, wherein the body is bent along the curved surface, and a plurality of heat dissipation fins stand on an outer surface of at least one of the first member or the second member.

The heat exchanger with this configuration is disposed along the curved surface of the aircraft engine, and cools cooling target fluid when being exposed to an airflow flowing in the engine. This heat exchanger is a so-called surface cooler.

The body of the heat exchanger is formed by stacking the plate-like first and second members in the thickness direction and joining these members together, and is not formed by extrusion as described in Patent Document 1. Thus, as described above, heat dissipation fins are formed not by such a process of scraping a thin surface portion of the extruded product and causing the scraped portion to stand, but by at least partially removing, e.g., cutting, the outer surface of the plate-like first member and/or the outer surface of the plate-like second member before bonding the first and second members. This method ensures sufficient performance of the heat dissipation fins. The height of the heat dissipation fins depends on the original thickness of the first member and/or the second member. The pitch of the heat dissipation fins depends on the groove width in cutting between the heat dissipation fins in a process on the first member and/or the second member. Thus, the height and the pitch of the heat dissipation fins can be freely determined independently of each other. That is, both an increase in height of the heat dissipation fins and a reduction in pitch of the heat dissipation fins can be achieved, thereby making it possible to reduce both the size and the weight of the heat exchanger while maintaining desired performance.

The first member may have a recessed portion that is recessed relative to a surface to which the second member is joined and that is open at the surface, the corrugated fin plate may be disposed in the recessed portion of the first member, and the second member may be joined to, and overlaps, the first member such that the corrugated fin plate covers an opening of the recessed portion of the first member while being disposed in the recessed portion. In this configuration, the recessed portion of the first member and the second member covering the opening of the recessed portion define the channel in the body.

The body may include: a channel portion in which the corrugated fin plate is held between the first member and the second member in the thickness direction; and a header portion which communicates with the channel portion and in which the corrugated fin plate is not disposed, and the first member or the second member may have a communication hole that penetrates the first member or the second member in the thickness direction and communicates with the header.

In the body formed by joining the first member and the second member, the channel portion where the corrugated fin plate is disposed is provided, and the header portion can also be provided by not disposing the corrugated fin plate. In addition, the first member or the second member has a communication hole that penetrates the first or second member in the thickness direction to communicate with the header portion. Thus, the through hole can serve as an inlet port for allowing cooling target fluid to flow into the header portion or an outlet port allowing cooling target fluid to flow out of the header portion. That is, the heat exchanger with this configuration does not need a header member as a separate member from the body. This is advantageous for reduction in weight of the heat exchanger.

The corrugated fin plate may include a plurality of corrugated fin plates, and one of the corrugated fin plates adjacent to the header portion may have a rigidity higher than those of the other corrugated fin plates.

With this configuration, a relatively high internal pressure of the header portion is applied especially to an end of the corrugated fin plate adjacent to the header portion, i.e., the corrugated fin plate disposed in the channel portion at the boundary between the header portion and the channel portion. The corrugated fin plate located at this location preferably has a high rigidity against the internal pressure. That is, "rigidity" herein refers to rigidity against an internal pressure.

On the other hand, in the channel portion of the body, the corrugated fin plate is held between the first member and the second member. The phrase of "being held between" refers to a situation in which the corrugated fin plate is sandwiched between the first member and the second member with the corrugated fin plate and the first member being in contact with (especially joined) each of the first and second member such that heat can be transmitted between the corrugated fin plate and each of the first and second members. Thus, the corrugated fin plates located at different positions from the corrugated fin plate adjacent to the header portion do not need to have a high rigidity because these corrugated fin plates are held between the first member and the second member.

In this manner, the rigidity of the corrugated fin plates may be changed depending on the location in the body of the heat exchanger. This configuration enables enhancement of performance of the heat exchanger and/or reduction in weight of the heat exchanger while inhibiting damage of the heat exchanger.

To change the rigidity of the corrugated fin plates, various techniques may be employed. For example, the rigidity may be increased by relatively increasing the thickness of the corrugated fin plates. Alternatively, the rigidity may be increased by reducing the fin pitch of the corrugated fin plates. The rigidity of the corrugated fin plates may also be changed by changing the types of the corrugated fin plates. The corrugated fin plates requiring a relatively high rigidity are, for example, plain fin plates, whereas corrugated fin plates allowing a relatively low rigidity may be, for example, perforated fin plates having holes in portions of the plain fin plates. The foregoing techniques may be combined in any manner as necessary.

The header portion may communicate with a bypass valve for allowing the cooling target fluid to bypass the channel.

As described above, in the body formed by joining the first member and the second member together, the number of header portions and the arrangement thereof may be defined as necessary depending on the arrangement of the corrugated fin plates. As described above, for example, a header portion disposed at an upstream end of the channel can serve as an inflow header, whereas a header portion disposed at a downstream end of the channel can serve as an outflow header.

The header portion may be disposed at a midpoint of the channel so that a bypass valve communicates with the header portion. Then, the bypass function can be incorporated in the heat exchanger. That is, by closing the bypass valve, cooling target fluid that has flown from the inflow header into the channel passes through the header portion at a midpoint of the channel without change, and reaches the outflow header at a downstream end of the channel. On the other hand, by remaining the bypass valve open, the cooling target fluid that has flown from the inflow header into the channel is allowed to flow out of the body of the heat exchanger from the header portion at a midpoint of the channel through the bypass valve. As a result, the cooling target fluid bypasses part of the channel.

Such a bypass function can be utilized for quickly increasing the temperature of cooling target fluid by avoiding passage of the cooling target fluid through part of the channel of the heat exchanger when, for example, the temperature of the cooling target fluid is below the melting point under a cryogenic temperature environment. The location of the bypass valve is not limited to the midpoint of the channel, and the bypass valve may be disposed upstream of the channel so that the fluid bypasses the entire heat exchanger. A plurality of bypass valves may be provided.

The heat dissipation fins may stand on the outer surface of each of the first member and the second member.

This configuration can enhance performance of the heat exchanger and achieve further reduction in size and/or weight of the heat exchanger.

The body may include a channel including a forward channel and a backward channel such that the cooling target fluid flows in opposite directions in the forward channel and the backward channel, and the forward channel and the backward channel may communicate with each other in the body.

In the body formed not by extrusion but by joining the first member and the second member together, the layout of the channel can be relatively freely determined. Thus, the channel including the forward channel and the backward channel that communicate with each other can be formed, thereby eliminating the necessity for attaching a U-turn header to the body in a subsequent process. This is advantageous for reduction in size and/or weight of the heat exchanger.

The body may have a shape constituting part of a conical surface.

In the heat exchanger with this configuration, the first member, the second member, and the corrugated fin plates, each having a plate shape, are stacked and joined together, and then bent into, for example, an arc shape. Alternatively, the first member, the second member, and the corrugated fin plates before being joined may be individually bent, and then stacked and joined together.

The radius of curvature at one edge perpendicular to the bent direction may be different from the radius of curvature at the other edge in the body such that the edge constitutes part of the conical surface.

Advantages of the Invention

As described above, in the heat exchanger for an aircraft engine, the body of the heat exchanger is formed by stacking the plate-like first and second members in the thickness direction and joining the first and second members together, and the corrugated fin plates are disposed in the channel in the body. Thus, the height and the pitch of the heat dissipation fins formed on the outer surface(s) of the first member and/or the second member may be freely determined independently of each other, thereby enabling reduction in size and weight of the heat exchanger.

BRIEF DESCRIPTION OF THE DRAWINGS

FIG. 8 is a block diagram illustrating a procedure of fabricating a heat exchanger.

DESCRIPTION OF EMBODIMENTS

Figure 1:
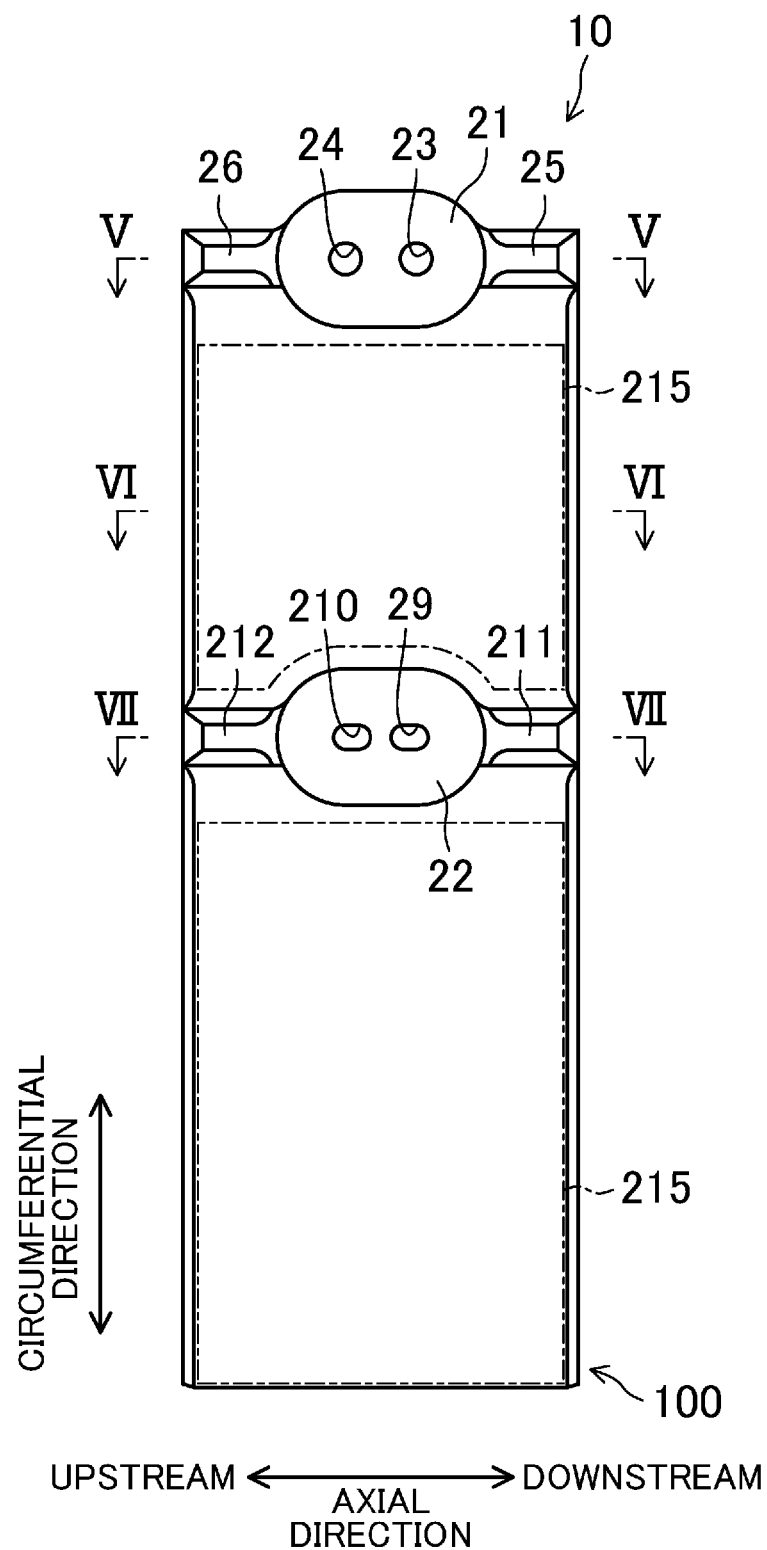
FIG. 1 is a front view illustrating a heat exchanger for an aircraft engine.
Figure 2:
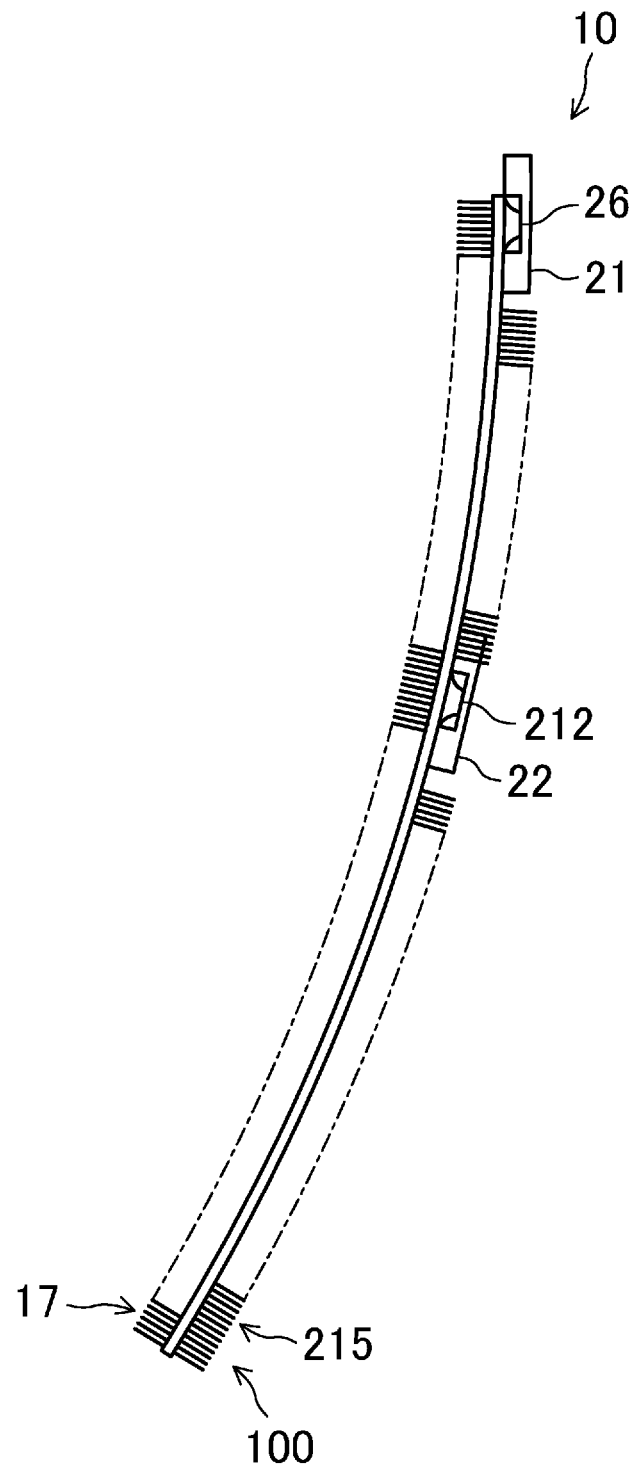
FIG. 2 is a side view illustrating the heat exchanger for an aircraft engine.
Figure 5:
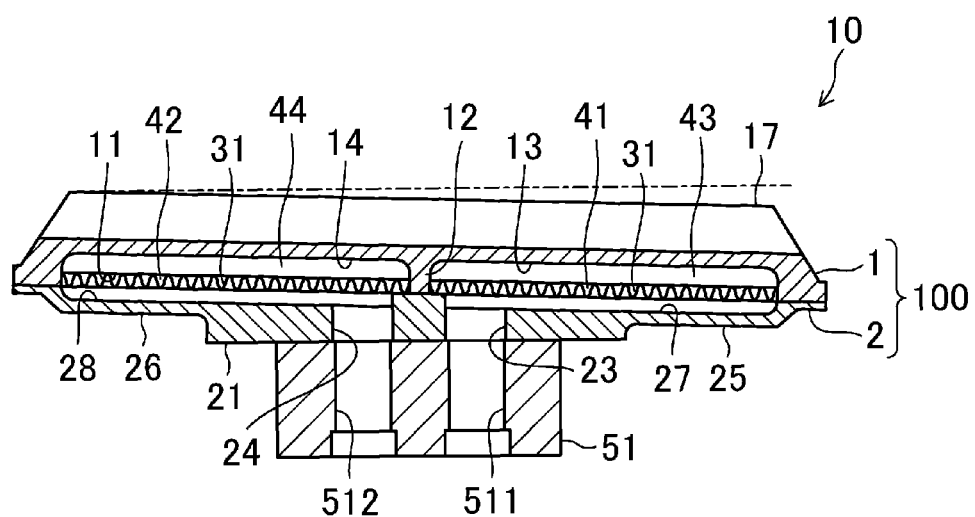
FIG. 5 is a sectional view taken along the line V-V in FIG. 1.
Figure 6:
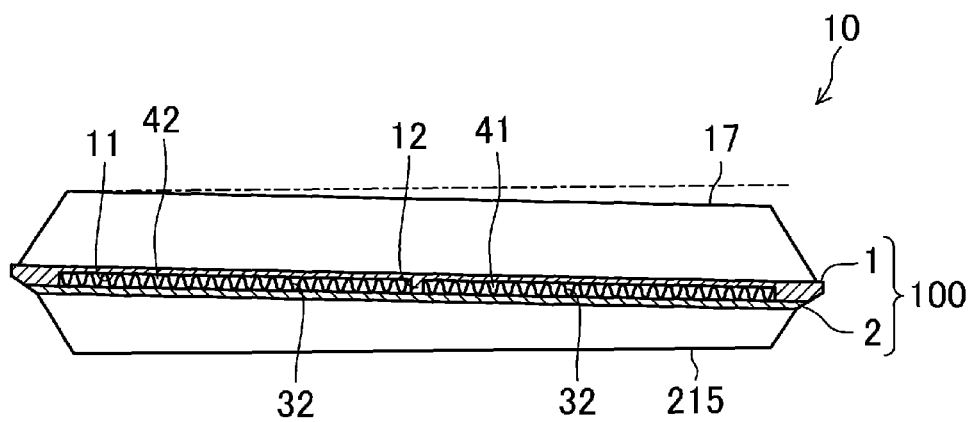
FIG. 6 is a sectional view taken along the line VI-VI in FIG. 1.
Figure 7:
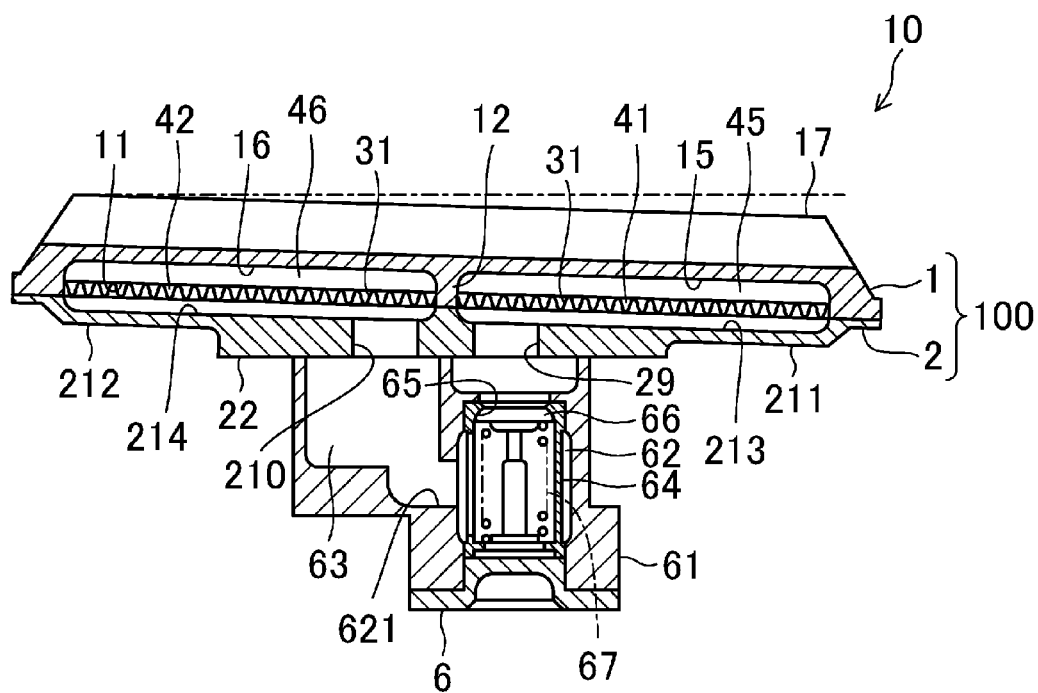
FIG. 7 is a sectional view taken along the line VII-VII in FIG. 1.

An embodiment of a heat exchanger for an aircraft engine will be described with reference to the drawings. The following embodiment is merely an example. FIGS. 1 and 2 illustrate a configuration of a heat exchanger 10. FIG. 1 is a front view of the heat exchanger 10. FIG. 2 is a side view of the heat exchanger 10. Although not shown, the heat exchanger 10 is mounted on an aircraft engine (e.g., a gas turbine engine), and is a heat exchanger for cooling a cooling target fluid that is lubricating oil of an engine or lubricating oil of a generator driven by the engine. As clearly illustrated in FIG. 2, the heat exchanger 10 is disposed along a curved surface such as an inner peripheral surface of a fan casing, for example. The heat exchanger 10 may be disposed at any location. In FIG. 1, the lateral direction in the drawing sheet is a direction along a rotation axis of the gas turbine engine, and the vertical direction in the drawing sheet is a circumferential direction. The illustrated heat exchanger 10 has a circumferential length that is about ⅛ of the entire circumference thereof. In FIG. 1, the left side in the drawing sheet corresponds to an upstream side of an airflow flowing in the gas turbine engine, and the right side in the drawing sheet corresponds to a downstream side of the airflow. Thus, the heat exchanger 10 is exposed to the air flowing from the left to the right in the drawing sheet. As illustrated in FIGS. 5 to 7, the radius of curvature of the edge at the upstream side of the arcuate heat exchanger 10 is smaller than the radius of curvature of the edge at the downstream side. The chain lines in FIGS. 5 to 7 indicate the horizon. The heat exchanger 10 has a shape constituting part of a conic surface as a whole.

Figure 3:
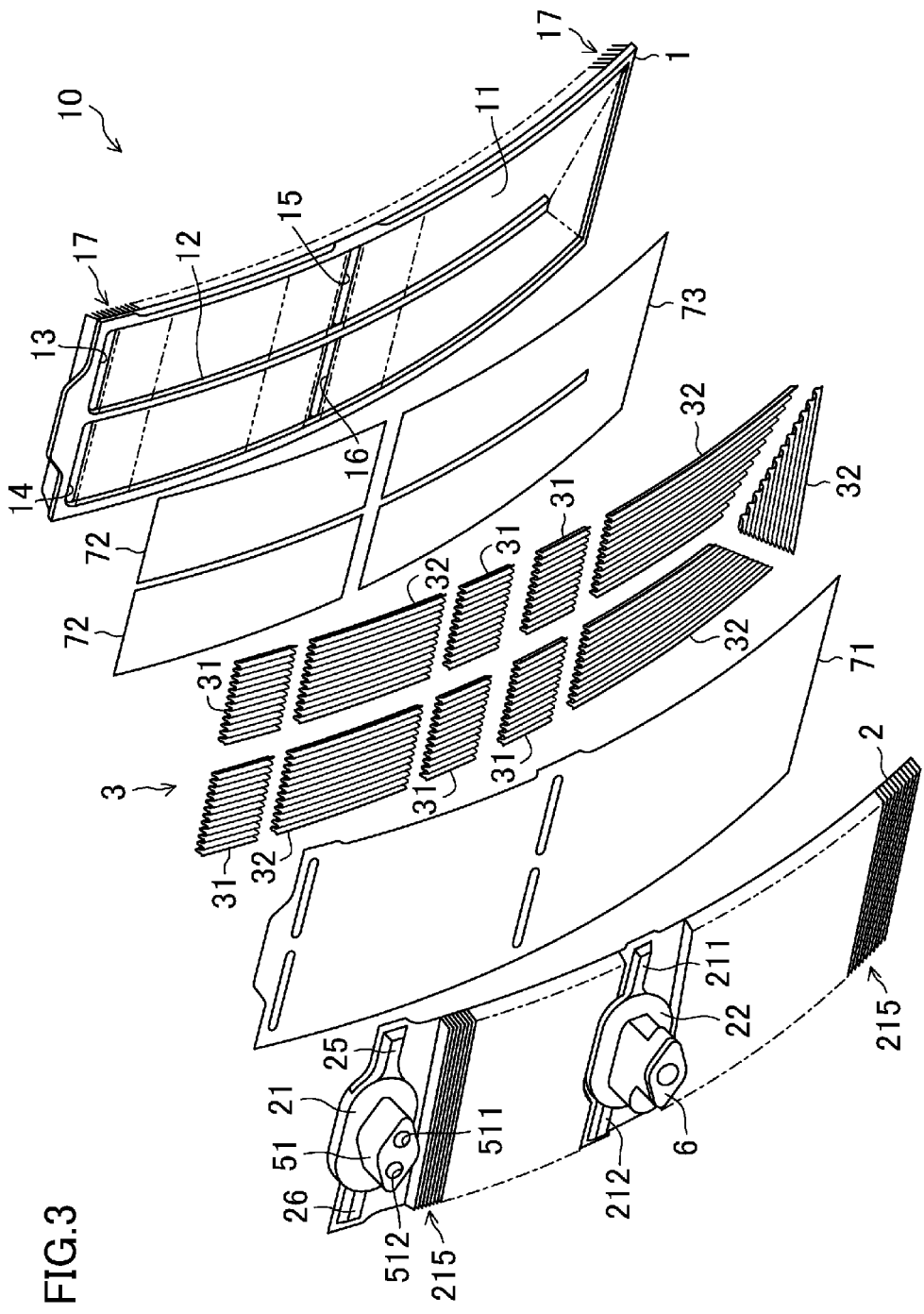
FIG. 3 is a disassembled perspective view of the heat exchanger.

FIG. 3 is a disassembled perspective view of the heat exchanger 10. In the heat exchanger 10, a plurality of corrugated fin plates 3 are disposed in a body 100 in which a first member 1 and a second member 2 are stacked in a thickness direction. In other words, the heat exchanger 10 is a stack of three members: the first member 1; the second member 2; and the corrugated fin plates 3, which are arranged in the thickness direction and bonded together by, for example, brazing. The heat exchanger 10 is made of, for example, aluminium or an aluminium alloy. Materials for the heat exchanger 10 are not specifically limited. The heat exchanger 10 may be made of various materials such as stainless steel, titanium, copper, or inconel.

The first member 1 is a rectangular plate-like member, and in the illustrated example, the circumferential length is larger than the axial length, i.e., the first member 1 has a band shape as a whole. The inner surface (i.e., the surface shown in FIG. 3) of the first member 1 has a recessed portion 11 that is recessed relative to the surface thereof. The recessed portion 11 has a predetermined rectangular shape except for the outer rim of the first member 1 that is rectangular as a whole. That is, the first member 1 having the recessed portion 11 has a bathtub shape. The recessed portion 11 defines part of a channel 4 for cooling target fluid formed in the body 100, which will be described later. The corrugated fin plates 3 are disposed in the recessed portion 11.

Figure 4:
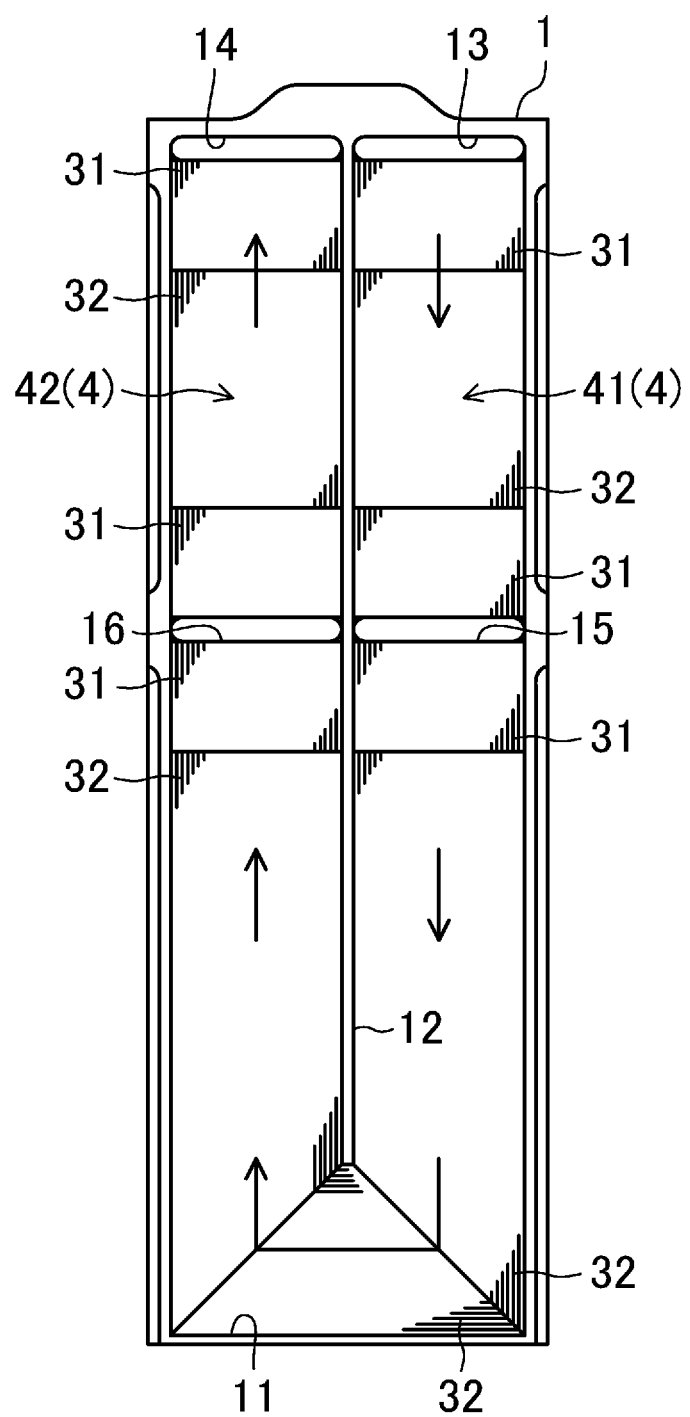
FIG. 4 is a front view illustrating a state in which corrugated fin plates are disposed in a first member.

As illustrated in FIGS. 3 and 4, a separator 12 is formed at the axial middle of the recessed portion 11 and extends from a circumferential end (i.e., the top in FIG. 4) to the other circumferential end (i.e., the bottom in FIG. 4) of the separator 12. The separator 12 divides the channel 4 for cooling target fluid into a forward channel 41 and a backward channel 42, which will be specifically described later. The arrows in FIG. 4 indicate the flow of cooling target fluid. The separator 12 extends halfway in the circumferential direction in the recessed portion 11. At the other end in the recessed portion 11, the forward channel 41 and the backward channel 42 communicate with each other. The channel 4 for cooling target fluid defined by the recessed portion 11 and the separator 12 has a U-shape as a whole.

Grooves 13 and 14 are formed in a circumferential end of the recessed portion 11. The grooves 13 and 14 axially extend at both axial ends with the separator 12 sandwiched therebetween. As clearly illustrated in FIG. 5, the grooves 13 and 14 are deeper than the recessed portion 11. The groove 13 located closer to the forward channel 41 than the groove 14 constitutes an inflow header 43 allowing cooling target fluid to flow into the channel 4, together with a groove 27 of the second member 2, which will be described later. The groove 14 located closer to the backward channel 42 than the groove 13 constitutes an outflow header 44 allowing cooling target fluid to flow out of the channel 4, together with a groove 28 of the second member 2, which will be described later.

Grooves 15 and 16 similar to the grooves 13 and 14 are formed in a circumferential middle of the recessed portion 11 (see also FIG. 7). Specifically, the grooves 15 and 16 axially extend at both axial ends with the separator 12 sandwiched therebetween. The grooves 15 and 16 are deeper than the recessed portion 11. The two grooves 15 and 16 constitute bypass headers 45 and 46 for bypassing part of the channel 4 of the heat exchanger 10, together with grooves 213 and 214 of the second member 2, which will be described later.

A large number of heat dissipation fins 17 stand on the outer surface (i.e., the left surface in the drawing sheet of FIG. 2 and the top surface in the drawing sheets of FIGS. 5-7) of the first member 1. In FIGS. 1-3, a region where the heat dissipation fins 17 are disposed is indicated by chain lines, and some of the heat dissipation fins 17 are not shown. The heat dissipation fins 17 are axially arranged on the substantially overall outer surface of the first member 1. The fin height and the fin pitch of the heat dissipation fins 17 are appropriately defined.

In a manner similar to the first member 1, the second member 2 is a rectangular plate-like member, and in the illustrated example, the circumferential length is larger than the axial length, i.e., the second member 2 has a band shape as a whole. No recessed portions are formed in the inner surface of the second member 2. The second member 2 has a lid shape that covers the bathtub-shaped first member 1. A port attachment part 21 to which a port member 51 as a unit of an inlet port 511 and an outlet port 512 is attached and a valve attachment part 22 to which a bypass valve 6, which will be specifically described later, is attached are formed on the outer surface (i.e., the surface shown in FIG. 3) of the second member 2.

The port attachment part 21 is located at a circumferential end of the second member 2. As illustrated in FIGS. 1 and 5, the port attachment part 21 has two through holes 23 and 24 penetrating the port attachment part 21 in the thickness direction and arranged side by side in the axial direction.

Two protrusions 25 and 26 are formed on the outer surface of the second member 2 and axially extend at both axial ends with the port attachment part 21 sandwiched therebetween. As illustrated in FIG. 5, the protrusions 25 and 26 respectively have grooves 27 and 28 in the inner surface (i.e., the upper surface in FIG. 5) of the second member 2. The groove 27 formed in the protrusion 25 communicates with the through hole 23 of the port attachment part 21. The groove 28 formed in the protrusion 26 communicates with the through hole 24 of the port attachment part 21. When the second member 2 overlaps the first member 1, the grooves 27 and 28 respectively face the grooves 13 and 14 of the first member 1 and define the inflow header 43 and the outflow header 44. As illustrated in FIG. 5, each of the inflow header 43 and the outflow header 44 is thicker than the channel 4 (see also FIG. 6).

As described above, the port member 51 attached to the port attachment part 21 has the inlet port 511 and the outlet port 512. The inlet port 511 communicates with the through hole 23 of the port attachment part 21, and the outlet port 512 communicates with the through hole 24 of the port attachment part.

The inlet port 511 is connected to a piping (not shown), and cooling target fluid is supplied through the piping and flows into the channel 4 (i.e., the forward channel 41) in the body 100 through the inlet port 511, the through hole 23, and the inflow header 43. Cooling target fluid that has passed through the channel 4 (i.e., the backward channel 42) in the body 100 flows out of a piping (not shown) connected to the outlet port 512 through the outflow header 44, the through hole 24, and the outlet port 512.

The valve attachment part 22 is located at a circumferential middle of the second member 2. As illustrated in FIGS. 1 and 7, the valve attachment part 22 also has two through holes 29 and 210 penetrating the valve attachment part 22 in the thickness direction.

In a manner similar to both ends of the port attachment part 21, two protrusions 211 and 212 are formed at both axial ends sandwiching the valve attachment part 22. As illustrated in FIG. 7, the protrusions 211 and 212 respectively have grooves 213 and 214 in the inner surface (i.e., the upper surface in FIG. 7) of the second member 2. The groove 213 formed in the protrusion 211 communicates with the through hole 29 of the valve attachment part 22. The groove 214 formed in the protrusion 212 communicates with the through hole 210 of the valve attachment part 22.

When the second member 2 overlaps the first member 1, the grooves 213 and 214 respectively face the grooves 15 and 16 of the first member 1, and define the bypass header 45 close to the forward channel 41 and the bypass header 46 close to the backward channel 42. Thus, the through hole 29 communicates with the bypass header 45 close to the forward channel 41, and the through hole 210 communicates with the bypass header 46 close to the backward channel 42. As illustrated in FIG. 7, each of the bypass headers 45 and 46 is thicker than the channel 4 (see also FIG. 6).

A large number of heat dissipation fins 215 are circumferentially arranged at a predetermined pitch and stand substantially on the overall surface of the outer surface of the second member 2 except the port attachment part 21 and the valve attachment part 22. The fin height and the fin pitch of the heat dissipation fins 215 are appropriately defined. A region where the heat dissipation fins 215 of the second member 2 is also indicated by chain lines and some of the heat dissipation fins 215 are not shown in the drawings.

Now, a configuration of the bypass valve 6 attached to the valve attachment part 22 will be briefly described with reference to FIG. 7. In this example, the bypass valve 6 is a differential pressure shut-off valve, and opens and closes in accordance with a differential pressure between the bypass header 45 and the bypass header 46. The bypass valve 6 includes a valve casing 61 attached to the valve attachment part 22. The valve casing 61 includes an inflow chamber 62 that communicates with the through hole 29 of the valve attachment part 22 and an outflow chamber 63 that communicates with the through hole 210 of the valve attachment part 22. The inflow chamber 62 and the outflow chamber 63 communicate with each other through a communication hole 621. The inflow chamber 62 incorporates a valve mechanism. The valve mechanism includes a cylindrical valve body 64, a valve 66 seated on a valve seat 65 formed on the valve body 64, and a compression coil spring 67 that biases the valve 66 to a closed side. The cylindrical valve body 64 has one open end in the axial direction (i.e., the vertical direction in FIG. 7) of the cylinder in which the valve seat 65 is formed. An opening for allowing the inside and outside of the valve body 64 to communicate with each other is provided in the circumferential surface of the valve body 64. In this manner, the through hole 29 of the valve attachment part 22 communicates with the through hole 210 through the valve seat 65, the inside of the valve body 64, the communication hole 621, and the outflow chamber 63.

The valve 66 is seated on the valve seat 65 of the valve body 64, and is configured to reciprocate in the cylinder axial direction of the valve body 64. The bypass valve 6 is opened or closed by switching between a state in which the valve 66 is seated on the valve seat 65 and a state in which the valve 66 is separated from the valve seat 65. When the bypass valve 6 is open, the through hole 29 and the through hole 210 in the valve attachment part 22 communicate with each other through the bypass valve 6. That is, the two bypass headers 45 and 46 in the body 100 communicate with each other through the outside of the body 100. On the other hand, when the bypass valve 6 is closed, the communication between the through hole 29 and the through hole 210 in the valve attachment part 22 is stopped. Consequently, the two bypass headers 45 and 46 in the body communicate with each other only through the channel 4 in the body 100.

The compression coil spring 67 is disposed to be externally fitted onto the shaft of the valve 66, and biases the valve 66 such that the valve 66 is pressed against the valve seat 65. In this manner, the bypass valve 6 is open when the differential pressure between the bypass header 45 and the bypass header 46 is a predetermined pressure or more, and is closed when the differential pressure between the bypass header 45 and the bypass header 46 is lower than the predetermined pressure. When the bypass valve 6 is closed, cooling target fluid that has flown into the forward channel 41 through the inflow header 43 passes through the bypass header 45, reaches the backward channel 42, and then flows into the outflow header 44 through the bypass header 46 of the backward channel 42. When the bypass valve 6 is closed, the two bypass headers 45 and 46 function as mixing headers provided at a midpoint of the forward channel 41 or the backward channel 42. That is, in each of the bypass headers 45 and 46, the cooling target fluid is mixed so that temperature distribution can be made uniform, thereby enhancing the performance of the heat exchanger 10.

On the other hand, when the bypass valve 6 is opened, cooling target fluid that has flown into the forward channel 41 through the inflow header 43 passes through the bypass valve 6 from the bypass header 45, flows in the bypass header 46 near the backward channel 42, and reaches the outflow header 44. When the bypass valve 6 is open, cooling target fluid bypasses part of the channel 4. Such a bypass function can be utilized for quickly increasing the temperature of cooling target fluid by avoiding passage of the fluid through part of the channel 4 of the heat exchanger 10 when, for example, the temperature of the cooling target fluid is below the melting point under a cryogenic temperature environment. As described above, the bypass valve is not limited to a pressure-responsive valve including a compression coil spring, and may be another type of pressure-responsive valve. Alternatively, a temperature-responsive valve may be employed.

As illustrated in FIGS. 3 and 4, the corrugated fin plates 3 are disposed at predetermined locations in the recessed portion 11 of the first member 1. The corrugated fin plates 3 divide the channel 4 for cooling target fluid into a plurality of channels connected from the inflow header 43 to the outflow header 44, and enlarges the heat transfer area. As plainly illustrated in FIG. 6, the corrugated fin plates 3 disposed in the recessed portion 11, i.e., in the channel 4, are sandwiched between the first member 1 and the second member 2 and joined to the inner surfaces of the first member 1 and the second member 2.

The corrugated fin plates 3 include a plurality of corrugated fin plates 3 having predetermined shapes in accordance with the locations. In the illustrated example, the corrugated fin plates 3 include: six relatively small rectangular corrugated fin plates 3 (corresponding to relatively rigid plates 31, which will be described later); two relatively large rectangular corrugated fin plates 3; two trapezoidal corrugated fin plates 3, and an approximately triangular corrugated fin plate 3. The rectangular corrugated fin plates 3 are disposed in the forward channel 41 or the backward channel 42. The triangular corrugated fin plate 3 is disposed at the location where the forward channel 41 and the backward channel 42 communicate with each other. The trapezoidal corrugated fin plates 3 are disposed between the rectangular corrugated fin plates 3 and triangular corrugated fin plate 3.

The corrugated fin plates 3 include relatively rigid plates 31 and relatively less rigid plates 32. The relatively rigid plates are plain fin plates 31 in this example. On the other hand, the relatively less rigid plates are perforated fin plates 32 in which through holes are formed at predetermined locations in the plain fin plate in this example.

As illustrated in FIG. 4, the plain fin plates 31 are located adjacent to the grooves 13, 14, 15, and 16 in the recessed portion 11 of the first member 1. These locations adjacent to the grooves 13, 14, 15, and 16 correspond to the location adjacent to the downstream side of the inflow header 43, the location adjacent to the upstream side of the outflow header 44, the locations adjacent to the upstream side and the downstream side of the bypass header 45 near the forward channel 41, and the locations adjacent to the upstream side and the downstream side of the bypass header 46 near the backward channel 42, respectively, in the body 100 of the heat exchanger 10. On the other hand, the perforated fin plates 32 are located at locations except locations where the plain fin plates 31 are disposed.

Referring now to FIG. 8, a procedure of fabricating the heat exchanger 10 with the above-described configuration will be described. The fabrication procedure roughly includes a formation process (P81 and P82) of the first member 1, a formation process (P83 and P84) of the second member 2, a formation process (P85 and P86) of the plain fin plates 31, a formation process (P87 and P88) of the perforated fin plates 32, and an assembly process (P89, P810, P811, and P812).

First, in the formation process of the first member 1, at P81, a plate member with a predetermined shape is prepared. The plate member only needs to a flat plate member with a predetermined thickness. The thickness of the plate member depends on the height of the heat dissipation fins 17 standing on the outer surface of the first member 1. Since the body 100 is to be processed by bending the body 100 into a conical shape, the flat plate member has a trapezoidal shape, which will be specifically described later. Then, at P82, the plate member is subjected to cutting, thereby forming the heat dissipation fins 17, the recessed portion 11, and the grooves 13, 14, 15, and 16. The fin pitch of the heat dissipation fins 17 is determined depending on the groove width in cutting between the fins. As described above, since the body 100 is to be bent into a conical shape, the heat dissipation fins 17 that are circumferentially arranged side by side are not parallel to each other. In this manner, a flat first member 1 is completed.

In a manner similar to P81, in the formation process of the second member 2, at P83, a plate member with a predetermined shape is prepared. The plate member is a flat plate member whose thickness corresponds to the fin height of the heat dissipation fins 215. The plate member is also trapezoidal. Then, at P84, the plate member is subjected to cutting, thereby forming the heat dissipation fins 215, the port attachment part 21, the valve attachment part 22, the protrusions 25, 26, 211, and 212, and the grooves 27, 28, 213, and 214. The heat dissipation fins 215 that are circumferentially arranged side by side are not parallel to each other. In this manner, a flat second member 2 is completed.

In the formation process of the plain fin plates 31, at P85, plain fin plates 31 are formed at a predetermined pitch with a known method. Then, at P86, the fin plates 31 are cut into predetermined shapes, i.e., predetermined rectangular shapes as illustrated in FIGS. 3 and 4. A necessary number of plain fin plates 31 with the predetermined shapes are prepared. The corrugated fin plates 31 are also flat.

Similarly, in the formation process of the perforated fin plates 32, at P87, perforated fin plates 32 are formed at a predetermined pitch with a known method. Then, at P88, the fin plates 32 are cut into predetermined shapes. Necessary numbers of the rectangular, trapezoidal, and triangular perforated fin plates 32 are prepared. The corrugated fin plates 32 are also flat.

In this manner, the first member 1, the second member 2, and the corrugated fin plates 31 and 32 are prepared. Then, in the assembly process, as illustrated in FIGS. 3 and 4, the corrugated fin plates 31 and 32 are disposed in the recessed portion 11 of the first member 1, and the second member 2 overlaps the first member 1 such that the opening of the recessed portion 11 is covered (at P89). At this time, as illustrated in FIG. 3, a plate-shaped brazing filler metal with a predetermined shape (i.e., three types of plates 71, 72, and 73 in the illustrated example) is interposed between the first member 1 and each of the corrugated fin plates 31 and 32 and between the second member 2 and each of the corrugated fin plates 31 and 32. Although the members are bent in FIG. 3, the members are flat at P89 in the fabrication procedure illustrated in FIG. 8.

Thereafter, at P810, the first member 1, the corrugated fin plates 31 and 32, and the second member 2 are integrated by brazing. The integrated member (i.e., the body 100) is flat. Subsequently, at P811, the integrated ember is bent into a predetermined conic shape.

Then, at P812, members such as a port member 51 and a bypass valve 6 are attached to the bent body 100, thereby completing a heat exchanger 10.

In the heat exchanger 10, the body 100 is formed by stacking and joining the plate-like first and second members 1 and 2 in the thickness direction. Thus, each of the heat dissipation fins 17 standing on the outer surface of the first member 1 and the heat dissipation fins 215 standing on the outer surface of the second member 2 can be formed by cutting the plate members as described above. In such a process, the fin heights of the heat dissipation fins 17 and 215 depend on the thicknesses of the plate members, and the fin pitches of the heat dissipation fins 17 and 215 depend on the groove widths in cutting between the fins. Thus, the heights and the pitches of the heat dissipation fins 17 and 215 can be freely determined independently of each other. This determination enables both an increase in height of the heat dissipation fins 17 and 215 and a reduction in pitch of the heat dissipation fins 17 and 215. As a result, the heat exchanger 10 can be made small and lightweight while maintaining desired performance. The heat dissipation fins 17 and 215, of course, are integrated with the body 100 such that heat is transmitted therebetween.

The body 100 configured by joining the first member 1 and the second member 2 includes not only the channel 4 provided with the corrugated fin plates 31 and 32 but also the inflow header 43 and the outflow header 44 provided with no corrugated fin plates 31 and 32. A separate header member does not need to be attached to the body 100. This configuration can further reduce the weight of the heat exchanger 10.

In the body 100 configured by joining the first member 1 and the second member 2, the layout of the channel 4 for cooling target fluid can be relatively freely determined. In the heat exchanger 10 with the above-described configuration, the separator 12 is provided in the recessed portion 11, thereby forming a U-turn channel including the forward channel 41 and the backward channel 42. In particular, in the above-described configuration, a portion allowing the forward channel 41 and the backward channel 42 to communicate with each other is also provided in the body 100. Thus, no separate U-turn header needs to be attached to the body 100. This configuration is also advantageous for reduction in weight of the heat exchanger 10.

In addition, a header can be disposed at any location in the body 100. In the above-described configuration, the bypass headers 45 and 46 are provided at a midpoint of the forward channel 41 and a midpoint of the backward channel 42, respectively. Thus, the bypass function of allowing cooling target fluid to bypass part of the channel 4 of the heat exchanger 10 can be incorporated without inhibiting reduction in weight. A header to which a bypass valve is attached is not necessarily provided in a midpoint of the channel, and may be located upstream of the channel such that cooling target fluid can bypass the entire heat exchanger 10. Alternatively, a plurality of bypass headers may be provided such that bypass valves are individually attached to the headers.

As illustrated in FIG. 6, the corrugated fin plates 31 and 32 in the body 100 are held between the first member 1 and the second member 2 in the thickness direction. Specifically, the corrugated fin plates 31 and 32 are joined to the inner surface of the first member 1 and the inner surface of the second member 2, respectively, by brazing.

The corrugated fin plates 31 adjacent to the inflow header 43, the outflow header 44, and the bypass headers 45 and 46, and particularly ends of the plates 31, are subjected to an internal pressure of the header, and the fins might be damaged. To avoid such damage, in the above-described configuration, the corrugated fin plates 31 located adjacent to the headers 43, 44, 45, and 46 have an increased rigidity against the internal pressure of the header. In this manner, damage of the corrugated fin plates 31 can be prevented. This reduces degradation of performance of the heat exchanger 10.

On the other hand, the corrugated fin plates 32 located except for the locations adjacent to the headers 43, 44, 45, and 46 are perforated fin plates. Thus, the performance of the heat exchanger 10 can be enhanced and the weight of the heat exchanger 10 can be reduced. Although the perforated fin plates divide the channel 4 into a plurality of channels, the channels communicate with each other through holes. Thus, even if one of the channels were blocked, cooling target fluid can flow through the channels (specifically, bypasses the blocked channel). In this manner, degradation of performance of the heat exchanger 10 can be advantageously reduced.

In the body 100 configured by the first member 1 and the second member 2, not only the plain and perforated corrugated fin plates, but also various types of corrugated fin plates may be disposed. This configuration can enhance the degree of freedom in designing the heat exchanger 10.

In the above-described configuration, both the first member 1 and the second member 2 include the heat dissipation fins 17 and 215. Alternatively, only one of the first member 1 or the second member 2 may include heat dissipation fins.

In the above-described configuration, only the first member 1 has the recessed portion 11. Alternatively, both the first member 1 and the second member 2 may have recessed portions so that the two recessed portions form the channel in the body 100 when the first member 1 and the second member 2 overlap each other.

The channel 4 in the body 100 does not need to have a U-shape including the forward channel 41 and the backward channel 42. An inflow header may be provided at one circumferential end of the body 100 with an outflow header being provided at the other circumferential end of the body 100 so as to form a channel in which cooling target fluid flows in one direction from one end to the other along the circumference. The bypass function is not necessary and may be omitted. In the configuration in which the inflow header is provided at one circumferential end of the body 100 and the outflow header is provided at the other circumferential end of the body 100, the bypass header can be provided at a midpoint in the circumferential direction. In this case, the bypass header functions as a header for causing cooling target fluid to flow out of the body 100 from the midpoint of the channel 4.

As described above, changing the rigidity of the corrugated fin plates is not necessarily achieved by employing the plain fin plates and the perforated fin plates as described above. Other types of corrugated fin plates may be employed as necessary. Instead of changing the types of the corrugated fin plates, the thickness of the corrugated fin plates may be changed. Specifically, in a portion requiring a relatively high rigidity, thick corrugated fin plates are employed, whereas in a portion allowing a relatively low rigidity, thin corrugated fin plates may be employed. The rigidity may also be changed by changing the fin pitch of the corrugated fin plates. Specifically, in a portion requiring a relatively high rigidity, corrugated fin plates arranged at a small fin pitch are employed, whereas in a portion allowing a relatively low rigidity, corrugated fin plates arranged at a large fin pitch may be employed.

In the above-described configuration, bending is performed after stacking and joining the first member 1, the second member 2, and the corrugated fin plates 3. Alternatively, after the first member 1, the second member 2, and the corrugated fin plates 3 have been individually bent, the first member 1, the second member 2, and the corrugated fin plates 3 may be stacked and joined together.

INDUSTRIAL APPLICABILITY

The heat exchanger disclosed herein is especially useful as a heat exchanger installed in an aircraft engine and used for cooling lubricating oil of an engine or a generator by using an airflow passing through the engine.

DESCRIPTION OF REFERENCE CHARACTERS

10 heat exchanger
100 body
1 first member
11 recessed portion
17 heat dissipation fin
2 second member
215 heat dissipation fin
23 through hole (communication hole)
24 through hole (communication hole)
29 through hole (communication hole)
210 through hole (communication hole)
3 corrugated fin plate
31 plain fin plate
32 perforated fin plate
4 channel (channel portion)
41 forward channel
42 backward channel
43 inflow header (header portion)
44 outflow header (header portion)
45 bypass header (header portion)
46 bypass header (header portion)
6 bypass valve

The invention claimed is:

1. A heat exchanger for an aircraft engine, the heat exchanger being disposed along a curved surface in the aircraft engine and configured to cool cooling target fluid when being exposed to an airflow flowing in the engine, the heat exchanger comprising:

a body including a plate-like first member and a plate-like second member that are stacked in a thickness direction of the first and second members and joined together, and a channel which is defined in the body and in which the cooling target fluid flows; and a plurality of corrugated fin plates disposed in the channel in the body, wherein the body is bent along the curved surface, a plurality of heat dissipation fins stand on an outer surface of at least one of the first member or the second member, the first member has a recessed portion that is recessed relative to a surface to which the second member is joined and that is open at the surface, the corrugated fin plates are disposed in the recessed portion of the first member, the second member is joined to, and overlaps, the first member, and covers an opening of the recessed portion of the first member while the corrugated fin plates are disposed in the recessed portion, the body includes: a channel portion in which the corrugated fin plates disposed in the recessed portion are held between the first member and the second member in the thickness direction; and a header portion which communicates with the channel portion and is disposed between the first member and the second member, wherein the corrugated fin plates are disposed between the first and second members in the recessed portion without extending to the header portion, the first member or the second member has a communication hole that penetrates the first member or the second member in the thickness direction and communicates with the header portion, and the corrugated fin plates include a plain fin plate and a perforated fin plate, the plain fin plate is adjacent to the header portion, and the perforated fin plate is not adjacent to the header portion, and the plain fin plate adjoins the perforated fin plate in the recessed portion.

2. The heat exchanger of claim 1, wherein
the header portion communicates with a bypass valve configured to allow the cooling target fluid to bypass the channel.

3. The heat exchanger of claim 2, wherein
the header portion is disposed at a midpoint of the channel.

4. The heat exchanger of claim 1, wherein
the heat dissipation fins stand on the outer surface of each of the first member and the second member.

5. The heat exchanger of claim 1, wherein
the body includes a channel including a forward channel and a backward channel such that the cooling target fluid flows in opposite directions in the forward channel and the backward channel, and
the forward channel and the backward channel communicate with each other in the body.

6. The heat exchanger of claim 1, wherein
the body has a shape constituting part of a conical surface.

7. The heat exchanger of claim 1, wherein
the plain fin plate and the perforated fin plate allow the cooling target fluid to flow in the same direction.

8. The heat exchanger of claim 1, wherein
the perforated fin plate is prepared by forming through holes in the plain fin plate.

9. The heat exchanger of claim 8, wherein
the plain fin plate is joined to the first and second members, and the perforated fin plate is joined to the first and second members.

* * * * *